United States Patent [19]

Polendo-Loredo

[11] Patent Number: 4,756,745
[45] Date of Patent: Jul. 12, 1988

[54] PROCESS TO BENEFIT COLEMANITE AND/OR HOWLITE MINERALS

[75] Inventor: Jose Polendo-Loredo, Monterrey, Mexico

[73] Assignee: Materias Primas Magdalena, S.A. DE C. V., Monterrey, Mexico

[21] Appl. No.: 8,526

[22] Filed: Jan. 29, 1987

[30] Foreign Application Priority Data

Jan. 29, 1986 [MX] Mexico ............................... 1387

[51] Int. Cl.$^4$ .................................................. C22B 1/11
[52] U.S. Cl. .......................................... 75/2; 423/278; 423/280; 423/283
[58] Field of Search ................ 423/280, 283, 278; 75/2

[56] References Cited

U.S. PATENT DOCUMENTS

| 289,836 | 12/1883 | Hobson | 423/283 |
| 1,927,013 | 9/1933 | Cramer et al. | 423/283 |
| 2,855,276 | 10/1958 | May et al. | 423/283 |

FOREIGN PATENT DOCUMENTS

| 2454409 | 5/1975 | Fed. Rep. of Germany | 423/283 |
| 915191 | 1/1963 | United Kingdom | 423/283 |

*Primary Examiner*—Patrick P. Garvin
*Attorney, Agent, or Firm*—Abelman Frayne Rezac & Schwab

[57] ABSTRACT

An improved process to benefit colemanite and/or howlite minerals comprising the stages of: treating mineral with sulfuric acid in order to dissolve boron compounds; separating the solution formed from the solids in suspension; reacting said solution with hydrogen sulfide in order to precipitate the arsenic and iron impurities contained in the solution, and separating the impurities precipitated from the remaining solution as a beneficiated colemanite with boron. Said solution of the beneficiated colemanite with boron can be dried by spray fluidizing in order to obtain solid beneficiated colemanite with boron or said solution can be reacted with calcium hydroxide to precipitate a beneficiated colemanite with calcium borate which is separated from the remaining solution. This can be recycled for treatment with sulfuric acid to concentrate the mineral.

The beneficiated colemanite with precipitated calcium borate, can be reacted with sulfuric acid in order to separate gypsum from the solution, while evaporating the remaining solution to precipitate boric acid. Said evaporation could be partial, while recycling the remaining solution to the evaporation stage to concentrate the boric acid.

10 Claims, 3 Drawing Sheets

PROCESS TO BENEFIT COLEMANITE AND/OR HOWLITE MINERALS

FIELD OF THE INVENTION

The present invention refers to an improved process to benefit colemanite and/or howlite minerals, and more particularly, this invention is related to a process for beneficiating colemanite minerals ($2CaO.3B_2O_3.5H_2O$) and or howlite minerals ($4CaO.5B_2O_3.2 SiO_2.5H_2O$) to be used as starting materials in order to obtain boric acid, which itself is used as a source of $B_2O_3$ for the manufacture of glass, ceramics, refractories, etc., mainly as a flux. By this process there is obtained colemanite, as well as howlite, free of impurities, such as arsenic and iron, with high levels of yield.

BACKGROUND OF THE INVENTION

A multiplicity of processes to obtain boron compounds are well known in the art, particularly boric acid, such as the colemanite and/or the howlite minerals, as well as some other minerals containing borax, among which the process described by Taylor, U.S. Pat. No. 2,746,841, granted to Borax Consolidated, Ltd. and issued on May 22, 1956, can be mentioned. In that process a mineral containing insoluble minerals and borax ($Na_2B_4O_7.10H_2O$), together with a mother liquid obtained from the process used for dissolving borax, are introduced in a dissolving tank, and the borate solution is separated from the insoluble fraction of the mineral in order to take the clear solution to a sulfate reactor. The solution is treated with sulfuric acid so as to convert all of the sodium oxide in the solution to sodium sulfate, thus producing an acid solution containing, primarily, sodium sulfate and boric acid. The acidified solution is heated so that the concentration of sodium sulfate exceeds the solubility of normal saturation at the existing temperature in order to precipitate anhydrous sodium sulfate. The precipitate is separated from the solution and washed so that it can be sold as pure sodium sulfate. The remaining solution, saturated with sodium sulfate and containing boric acid in elevated concentrations but not reaching saturation, is cooled or is concentrated and then cooled; this increases the solubility of the sulfate and boric acid is precipitated, which is crystallized from the cooled solution. The resulting crystals are separated from the solution and the boric acid thus crystallized is obtained as a product of the process. The remaining solution, which still contains sodium sulfate and boric acid in sufficiently high amounts to produce saturation, is returned as mother liquid to the mineral dissolving tank so that the dissolution stage can take place.

Another process known for the obtainment of boric acid is that described and claimed by Dwyer in U.S. Pat. No. 3,103,412, issued Sept. 10, 1963, assigned to Tholand, Inc. In that method, minerals containing calcium borate, such as colemanite and howlite, are treated to recover useful boron compounds from said minerals. The process comprises: mixing the mineral with aqueous ammonium sulfate; heating the mixture to produce an ammonium pentaborate mud, precipitated calcium sulfate and gangue; filtering the mud to separate calcium sulfate and the gangue; cooling the filtrate in order to crystallize the ammonium pentaborate; separating the crystalline pentaborate and reacting with sulfuric acid in order to form boric acid and ammonium sulfate. Said boric acid is recovered as a reaction product, and the ammonium sulfate solution thus formed is used to treat additional amounts of mineral.

Another process to benefit colemanite to obtain boron compounds is described by Warner, Jazzcryk; Irena, Jurkiewics and Jadwiga (Inst. Chem Nieorg., Gliwics, Pol.) Przem. Chem. 1977, 56(5), 264–6(Pol), which comprise a two-stage method for the decomposition of colemanite during the production of sodium perborate. In this process the colemanite is treated with a stoichiometric amount of sodium bicarbonate and a lower amount to the stoichiometry of caustic soda in order to form sodium borate, calcium borate and water. In the second stage, the colemanite not decomposed is treated with more caustic soda in order to obtain a stoichiometric amount for the total reaction. Then the colemanite is decomposed in a hour, which represents an improvement against the 90% decomposition of an alkaline stage process, wherein three hours are required.

Still another process to obtain boric acid from colemanite is that described by Mathis, Pierre (Solvay et Cie.) German Publication No. 2,020,570, dated Nov. 12, 1970 in which boric acid is prepared through the decomposition of crude or calcined colemanite with $CO_2$ at a pressure higher than atmospheric pressure and at moderate temperatures in the presence of water with later separation of the solid phase from the liquid phase, and crystallization of the boric acid from said liquid phase.

Another process to obtain boric acid through the decomposition of colemanite is described by Bozadzhiev, P. (Bulgarian), God Vissh Khim-Tekhnol Inst. Sofia, 1973, 21(2), 79–84 which comprises producing boric acid by decomposition of the colmanite with monocalcic phosphate and double superphospate. Decomposition percentages of 99.9% have been reported with said monocalcium phosphate and 98.1% with the superphosphate.

Another process for the decomposition of colemanite is one described by Bozadzhiev, P. (Bulgarian), God Vissh Khim-Tekhnol Inst. Sofia, 1973, 21 (2), 67–77 in which the colemanite is decomposed in the presence of an excess of phosphoric acid through the reaction of colemanite with 15% phosphoric acid, with which a practically quantitiative decomposition within 60 minutes at low temperature, or 20 minutes at a higher temperature is achieved. The velocity of decomposition is controlled by diffusion, so that a layer of the diffusion virtually consists of pure boric acid, while starting from colemanite monocalcium phosphate is formed.

Another process to obtain boric acid starting from minerals containing calcium, sodium and boron, such as ulexite, is described by Werner Janik et al in the Polish Patent No. 218,576, issued Sept. 26, 1979 appearing in German publication No. 3,029,349, issued Apr. 16, 1981. It includes the manufacture of boric acid from Peruvian ulexite by heating of said ulexite in 96% sulfuric acid in an amount sufficient to precipitate calcium sulfate, resulting in a suspension of calcium sulfate in a solution of boric acid, plus other secondary products. The calcium sulfate is separated from the solution and is then treated with ion exchange apparatus in order to obtain the boric acid by acidification, crystallization and purification.

Finally, another process is known to obtain boric acid from minerals such as Kernite. This method is described by Miroslav Novak et al in the Czechoslovakian Patent No. 184,560, dated Feb. 15, 1981. With this method, 74 to 83% of the total $B_2O_3$ contained in the kernite mineral or in the borax is recuperated through the decomposition of such minerals with diluted nitric acid at a relatively elevated temperature and the separation of the crude boric acid from the cooled solution. The mother liquors are concentrated to produce additional boric acid and the residual liquid phase is evaporated to give a fertilizer containing sodium nitrate and boric acid.

However, all of the processes described above and others of the prior art, require that it be carried out by the use of a starting material, i.e., a mineral of a high grade or quality and of a low degree of contamination by arsenic, since otherwise, the resulting products would be contaminated by said impurities, particularly arsenic, and the minerals are not beneficiated with adequate efficiency. There are large amounts of colemanite and howlite mineral deposits of a low grade or qaulity and which are highly contaminated. Man has searched a long time for a way to exploit the stated deposits even though to date it has not been possible in view of the fact that all of the existing processes in the prior art were unable to beneficiate the stated minerals with reasonable efficiency. Therefore, for a long time, economic and efficient processes have been searched for in order to beneficiate these type of minerals of low grade and high degree of contamination.

Even though numerous investigations have been carried out in order to exploit the stated minerals, whether by the concentration or the beneficiating methods, including the elimination of arsenic, iron and sulfate in order to obtain a boric acid useful for the glass industry, the procedures that have been tried to date using this particular method have not been entirely satisfactory. Such process have included mechanical methods, such as mill, attrition, flotation, etc., as well as chemical methods, such as the process of lixiviation, extraction by solvents or calcination. But even with all the processes that have been tried up to now, it has been found that a mineral is produced which is more or less concentrated and it can be beneficiated with an average yield rate of 38 to 48% of $B_2O_3$ and with a relatively high recuperation rate of from 68 to 75%. These processes have not been sufficiently economical to try on an industrial scale, and they are incapable of adequately eliminating the arsenic, iron and aluminum contaminants contained in the minerals.

OBJECTIVES OF THE INVENTION

Having in mind the defects of the existing processes in the prior art, it is an object of the present invention to provide a process for the preparation of boric acid from colemanite and/or howlite minerals which can be economic, which can start from low grade minerals having a high content of impurities, and which can have a high degree of efficiency.

Another object of the present invention is to provide a process for obtaining boric acid from colemanite and howlite minerals, of the previously described nature, which, through the use of solvent extraction stages can be carried out economically and efficiently in order to eliminate the impurities contained in the starting minerals and obtain very pure products.

Another object of the present invention is to provide a process for obtaining boric acid from colemanite and/or howlite minerals of the type described above, which overcome the necessity to obtain a high recuperation of boron compounds contained in the starting mineral and without the use of expensive procedural steps and reagents.

A more particular object of the present invention is to provide an improved process to benefit colemanite and/or howlite minerals of the type previously indicated, which is capable of obtaining a beneficiated mineral that can be used to obtain boric acid of an adequate purity for use in the glass industry.

BRIEF SUMMARY OF THE INVENTION

In accordance with the preferred embodiments of the present invention, the colemanite and/or howlite are beneficiated through a process comprising: treating mineral with sulfuric acid in order to dissolve boron compounds; separating a solution formed from the solids in suspension; reacting said solution with hydrogen sulfide in order to precipitate the arsenic and iron impurities contained in the solution, and separating the impurities precipitated from the solution that remains as a beneficiated colemanite with boron. Said solution of the beneficiated colemanite with boron can be dried by spray fluidizing in order to obtain solid beneficiated colemanite with boron, or said solution is reacted with calcium hydroxide to precipitate a beneficiated colemanite with calcium borate which is separated from the remaining solution. This can be recycled for treatment with sulfuric acid to concentrate the mineral.

The beneficiate colemanite with precipitated calcium borate, can be reacted with sulfuric acid in order to separate gypsum from the solution, and the remaining solution is evaporated in order to precipitate boric acid.

This evaporation can be partial, the remaining solution being recycled to the evaporation stage for concentrating the boric acid.

BRIEF DESCRIPTION OF THE DRAWINGS

The novel aspects which are considered typical of the present invention will be particularly disclosed by the attached claims. However, the invention itself, both because of its organization as well as its method of operation, together with other obejcts and advantages of the same, will be better understood from the following description of specific embodiments, when it is read in relation to the attached drawings, wherein:

DETAILED DESCRIPTION

As is well known, there are enormous deposits of colemanite ($2CaO.3B_2O_3.5H_2O$) and/or howlite ($4CaO.5B_2O_3.2SiO_2.5H_2O$), minerals which to-date have not been beneficiated because an adequate process did not exist for the concentration of those boron minerals together with the elimination of impurities contained therein, since the traditional processes, as was previously pointed out, were not capable of purifying minerals having a high content of impurities and of a low grade.

Colemanite and howlite are minerals widely used as starting materials to obtain boric acid which, in turn, constitutes a source of boric acid ($B_2O_3$) for the manufacture of glass, ceramics, refractories, as well as other similar products, as a flux. However, the use of boric acid for those purposes depends on the quality of boric acid and on the amount of impurities contained therein, particularly arsenic.

In accordance with the present invention, a process is provided for the benefaction of colemanite and/or howlite minerals, by a solvent extraction process in order to produce, a colemanite which has an average of 38 to 48% of boric acid and with a surprisingly high rate of recovery of 70 to 86%. From the latter, production of boric acid which has a concentration from 92 to 96% and a rate of recovery from 86 to 94% is obtained.

Typical colemanite and howlite minerals to be beneficiated in accordance with the present invention, are minerals reported to contain the following individual components:

$Ca_2B_6O_{11}.5H_2O$
$CaSO_4$
$CaCO_3$
$CaHAsO_4$
$Al_2O_3$
$MgCO_3$
$MgSO_4$
$Na_2SO_4$
$R_2O_3$ (R being Fe, Cr, Ti, etc.)
$SiO_2$ insoluble
$H_2O$ in the form of humidity.

These minerals can vary considerably in the concentration of the diverse components previously cited, constituting either minerals of high purity, i.e. minerals containing high concentrations of borate $Ca_2B_6O_{11}.5H_2O$, as well as low amounts of impurities, particularly $Fe_2O_3$ and more particularly $CaHAsO_4$, and minerals of low grade having lower amounts of borate $Ca_2B_6O_{11}.5H_2O$ and higher amounts of impurities of $Fe_2O_3$, and particularly of $CaHAsO_4$.

The process of the present inventon, even though it can be applied mose economically to the benefit of any type of colemanite or howlite mineral of the previously described composition, is particularly useful in its application to lower grade and high impurity minerals in order to obtain a considerably elevated recovery and also high yields of boric acid.

Figure 1:
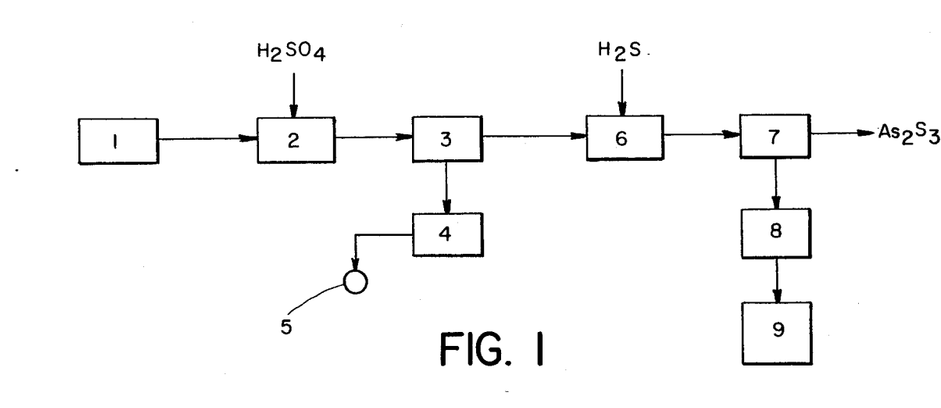
FIG. 1 is a flow diagram which illustrates the process to concentrate colemanite, or howlite minerals in accordance with the present invention.
Figure 2:
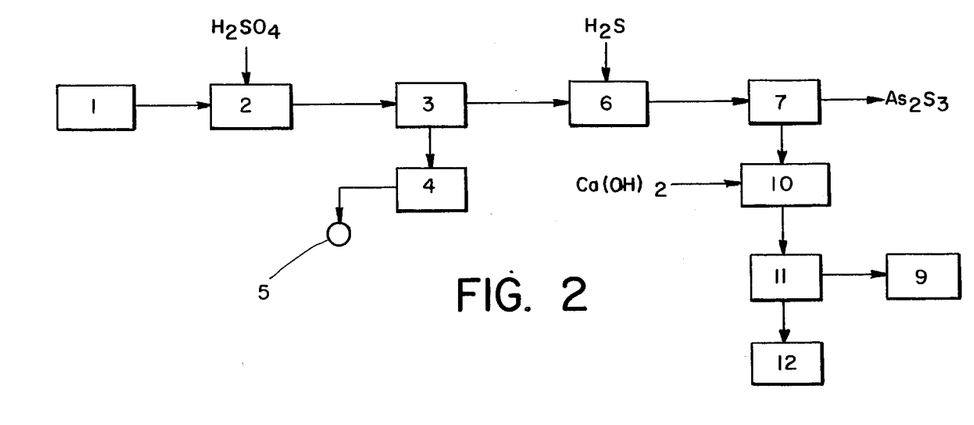
FIG. 2 is a flow diagram which illustrates an embodiment of the process in accordance with the present invention, to concentrate the colemanite or howlite minerals that contains boron with calcium borate.

Now, referring particularly to the drawings, mainly FIGS. 1 and 2, which show flow diagrams which illustrate the process of the present invention, which is a process for concentrating of colemanite and or howlite minerals through a solvent extraction process.

As is clearly illustrated in FIG. 1 of the drawings, which shows the process of concentrating colemanite and/or howlite minerals, said mineral is mixed in a mixer 1 with a predetermined amount of water, and afterwards the suspension is sent to reactor 2, wherein it is reacted with sulfuric acid 1:3 in excess, at a temperature of 85° C. to 95° C. and the reaction mixture is heated to boiling. This causes the boron, contained in the starting insoluble borate, to be dissolved as boric acid and remains as a solution in the suspension of the chemical reaction.

In the reactor 2, taking in consideration the components of colemanite and/or howlite in the treatment, the following chemical reactions take place:

As can be seen from the above, the reaction that takes place in the reactor 2 with sulfuric acid, forms a gangue or grey cake which is mainly formed by calcium sulfate, magnesium sulfate and other insoluble materials of gangue, and a solution containing mainly boric acid, orthoarsenic acid and ferric sulfate, jointly with some other amounts of aluminum sulfate, when the colemanite or the howlite contain said impurities.

The suspension thus formed in the reactor 2 is passed through a filter 3, wherein the grey cake 4 is separated and passed to waste disposal 5 and a filtrate containing water and the materials previously indicated in solution, is then passed to the reactor 6, wherein gaseous hydrogen sulfide is injected previous cooling of the solution or filtered at a temperature of about 23° C. to 90° C. The reaction with the hydrogen sulfide precipitates the compounds of arsenic and iron in reactor 6, in accordance with the following equations:

The suspension obtained in the reactor 6, is passed through a filter 7 to separate the sulfur arsenic cake at a temperature of about 23° C. to 25° C., thus obtaining a filtrate practically free from arsenic. This filtrate is a solution of colemanite beneficiated with boron. This solution is dried by a spray fluidizer 8, at a temperature of about 75° C. to 95° C., to obtain a beneficiated colemanite with boron. The latter in its dried and dusty state, is stored in receptacle 9.

The solution of beneficiated colemanite with boron obtained from the filter 7 shown in FIG. 1, instead of the solution being dried by the spray fluidizer, as is illustrated above, said solution is reacted with hydrate of lime, in the reactor 10, as is shown in the flow diagram of FIG. 2. A relatively high temperature between about 85° C. to 95° C. is maintained.

In the reactor 10, the boric acid contained in the filtrate is reacted to form calcium borate which is precipitated. The utilization of high amounts of energy to evaporate the water in the drying stage is reduced by the use of the spray fluidizer 8, as shown in the process illustrated in FIG. 1. Through the use of this stage, an energy saving is obtained. The specific reactions that are carried out in the reactor 10, are the following:

The suspension obtained in the reaction 10, is passed through a filter 11 to separate solid colemanite beneficiated with calcium borate which is stored in a receptacle 12. A filtrate 9 that contains the remains of boric acid and other soluble waste materials preferably can be recycled as is illustrated in the flow diagram of FIG. 3. Said diagram represents the same process as the flow diagram shown in FIG. 2, but with recirculation of the filtrate 9 to the reactor 2 of the process where it is used instead of water for the reaction with the sulfuric acid. Through this reaction the remains of boric acid, that has been dissolved in the filtrate 9, described previously, is constantly concentrated.

Figure 3:
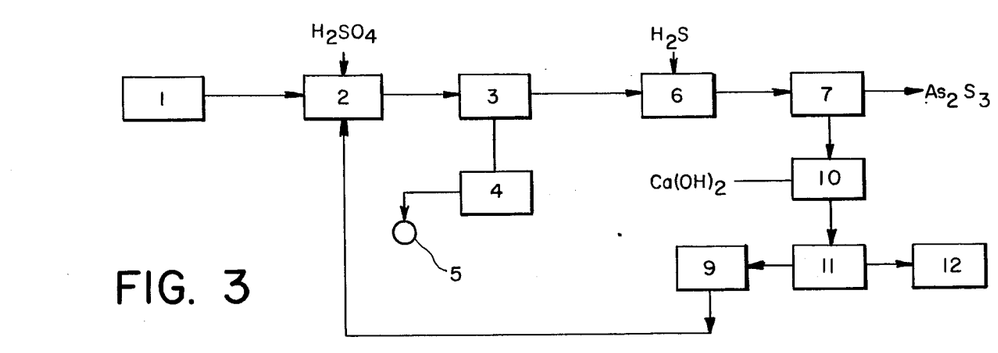
FIG. 3 is a flow diagram similar to the illustrated in FIG. 2, wherein a recycled stage is shown.
Figure 4:
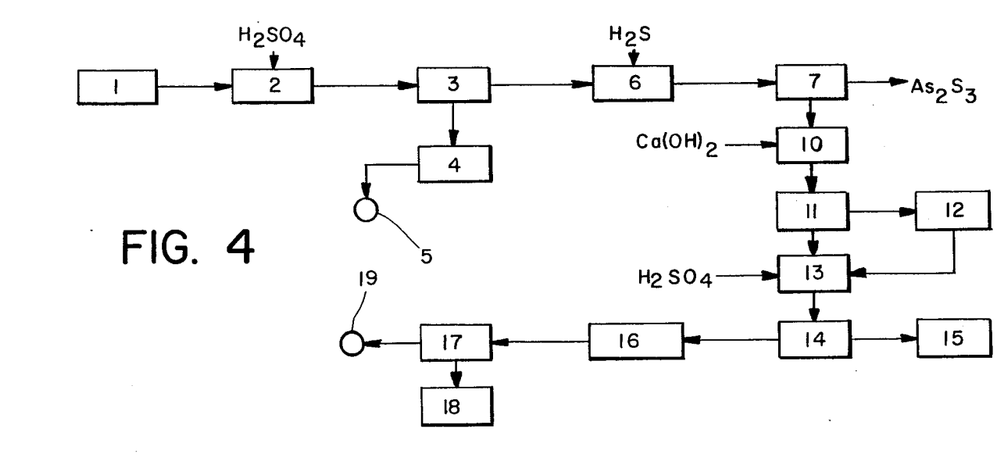
FIG. 4 is a flow diagram of a third embodiment of the process of the present invention, for the concentration of colemanite or howlite minerals to obtain boric acid.

In another embodiment of the process of the present invention, boric acid is produced from beneficiated colemanite with calcium borate which is obtained as a precipitate or cake on the filter 11, which is illustrated in the flow diagrams of the FIGS. 2 and 3. The entire precipitate 12 is passed to a reactor 13, or part of such precipitate can be stored to be used in the receptacle 12 and a part could be diverted to the reactor 13, such as is illustrated in FIG. 4 of the drawings. In said stage, the precipitate is reacted with sulfuric acid in order to dissolve the boron in the form of boric acid and precipitate calcium sulfate. This reaction is effectuated at a temperature between 85° C. and 98° C.

The suspension obtained is passed through a filter 14, where a cake of gypsum 15 and a filtrate containing boric acid is separated. The reaction which takes place in reactor 13 are the following:

$$Ca(BO_2)_2 + H_2SO_4 + 2 H_2O \rightarrow 2 H_3BO_3 + CaSO_4$$

The filtrate that contains boric acid is passed from the filter 14 to an evaporator 16, in order to concentrate the boric acid. Later it is filtered through a filter 17, to obtain boric acid which is stored in the receptacle 18, and a filtrate 19 that is sent to waste.

Figure 5:
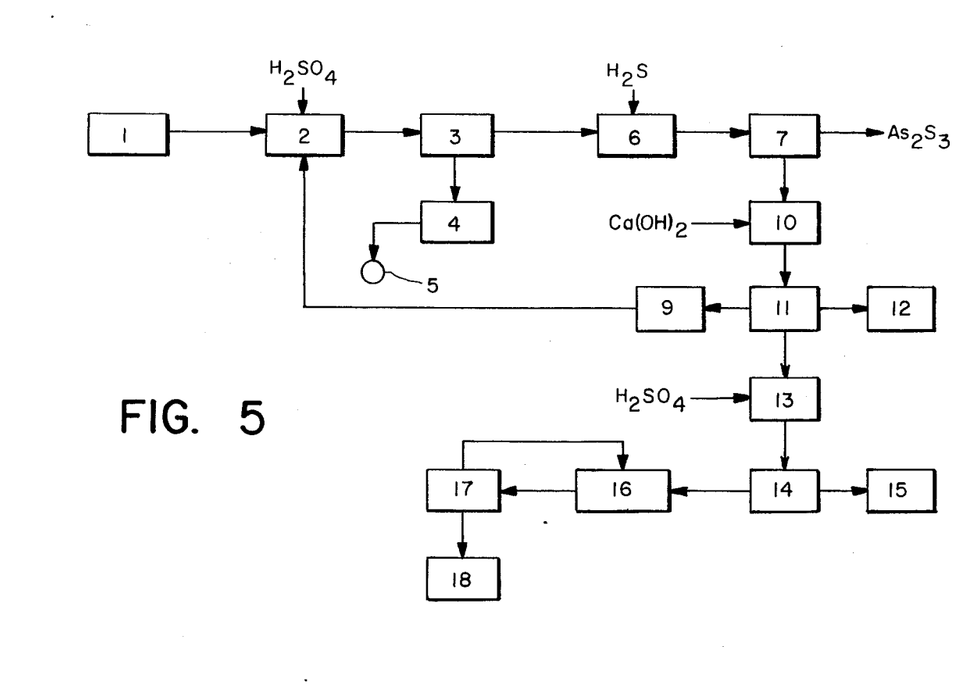
FIG. 5 is a flow diagram entirely similar to the illustrated in the FIG. 4, wherein a stage of intermediate recycling is shown.

As a modification of the process to obtain boric acid which was described before and illustrated in the flow diagram of FIG. 4 of the drawings, one can use the process of the flow diagram of the FIG. 5 of such drawings. This process represents exactly the same process as the flow diagram of FIG. 4, but with the difference that in this embodiment there is recirculation of the filtrate 9, coming from filter 11, where the calcium borate is formed. Later this is sent to reactor 2 where it is reacted with boric acid. Also the filtrate of the filter 17 is recycled to the evaporator 16 in order to concentrate the boric acid in the solution.

The present invention will be better understood by the following examples which, however, will not be taken as a limitation of the scope of the invention.

EXAMPLE 1

Obtaining Beneficiated Colemanite with Boron

To 100 grams of ground colemanite mineral, 650 ml. of water heated to a temperature of 95° C., were added forming a suspension. Afterwards, 75 ml. of 1:3 diluted sulfuric acid was slowly added to the solution while agitating and the mixture was heated to boiling and maintained digestion was maintained for approximately 2 minutes.

The suspension was filtered while hot at a temperature of 95° from the filtrating operation. 84.0 g. of a wet grey cake and 650 ml. of a filtrate were obtained.

To the obtained filtrate, hydrogen sulfide was injected at a temperature of 23° C. in order to filter the arsenic sulfide, forming in this way a cake of $As_2S_3$ at the same temperature.

The filtrate obtained was evaporated from a volume of 650 ml. to 150 ml. The solution obtained was dried at 75° C. in order to obtain concentrated boric acid with impurities, which is called beneficiated colemanite with boron with a weight of 44.99 g.

The results obtained from this example were as follows:

| PRODUCTS | AMOUNT | CONCEN-TRATION | GR. OF $H_3BO_3$ | YIELD |
|---|---|---|---|---|
| Colemanite | 100.0 g. | 29.69% | 29.69 | |
| Grey Cake | 84.0 g. | 1.21% | 1.02 | |
| Concentrate | 44.00 g. | 61.70% | 27.75 | 93.46% |

EXAMPLE 2

Obtainment of Beneficiated Colemanite With Calcium Borate

The process of example 1 was repeated, but instead of evaporating and drying the filtrate from the reaction with hydrogen sulfide, said filtrate was reacted with 42 ml. of lime slurry to a concentration of 361.2 grams. per liter of $Ca(OH)_2$. Then the calcium borate was formed jointly with some other impurities.

The mixture was agitated in order to homogenize the reaction and afterwards the suspension was filtered and separated from the liquor obtained. Thus a beneficiated colemanite cake with calcium borate was separated. Said colemanite was obtained with exactly the same results as in the previous example, in relation to the yields, but without the use of high amounts of water as was shown in the anterior example.

EXAMPLE 3

Obtaining Concentrated Liquor of Boric Acid

The beneficiated colemanite with calcium borate obtained by the process of Example 2 was dissolved in 100 ml. of water at a temperature of 95° C. and, thereafter, 50 ml. of 1:3 sulfuric acid was added.

The mixture was heated to reach its boiling point to realize a complete reaction and was filtered while hot to obtain a white cake of calcium sulfate and a concentrated liquor containing boric acid.

The results obtained from this process were as follows:

| PRODUCT | AMOUNT | CONCEN-TRATION | AMOUNT OF $H_3BO_3$ |
|---|---|---|---|
| Colemanite | 100.0 g. | 29.97% | 29.97 grams. |
| Grey Cake | 84.0 g. | 1.27% | 106.00 grams. |
| $As_2S_3$ Cake | 0.39 g. | 0.00% | 0.00 grams. |
| $CaSO_4$ Cake | 32.0 g. | 1.44% | 0.46 grams. |
| Light Liquor | 700 ml. | 10.39 g/liter | 7.27 grams. |
| Concentrated Liquor | 300 ml. | 70.09 g/liter | 21.03 grams. |

Yields of boric acid contained in the concentrated liquor: 70.2%.

NOTE: The light liquor of the anterior example, corresponds to the liquor obtained from the filtration of the beneficiated colemanite with calcium borate, after the reaction with lime.

EXAMPLE 4

Obtaining Concentrated Liquor of Boric Acid With Recirculation 700 ml. of the light liquor from the filter after the reaction stage with lime in Example 3 were obtained. Then 100 g. of colemanite were added in order to simulate a recirculation process of light liquor to the reaction stage with sulfuric acid. The mixture of liquor and colemanite was heated to 95° C. and 75 ml. of 1:3 sulfuric acid was added. The mixture was heated to reach boiling and was filtered while still hot.

To the filtrate obtained, sulfuric acid was injected to eliminate the arsenic, as it was described in the previous examples. Later, the suspension was filtered in order to separate the precipitated arsenic sulfide.

50 ml. of lime slurry, having a concentration of 361.2 g/liter of Ca(OH)$_2$, was added to the filtrate obtained and the solution was agitated in order to homogenize the reaction. The suspension was filtered to separate the precipitate of beneficiated colemanite with calcium borate from the light liquor. The precipitation of beneficiated colemanite with calcium borate was dissolved with 100 ml. of water at a temperature of 95° C. Thereafter, 50 ml. of sulfuric acid were added in order to produce boric acid. The mixture was heated to reach boiling and was filtered while hot and a cake of calcium sulfate thus obtained was washed with 50 ml. of water at 95° C.

Then, a concentrated liquor of boric acid in a volume of 300 ml. was separated from the filter.

As can be seen from the above, the difference between the process of this example with respect to the process described in Example 3, is that, instead of the use of water for the reaction of colemanite with the sulfuric acid, a recycled light liquor of the reaction stage with lime is utilized. With said solution the mineral is concentrated.

In conformity with the above, the following results were obtained:

| PRODUCT | AMOUNT | CONCEN-TRATION | GRAMS OF H$_3$BO$_3$ |
|---|---|---|---|
| Colemanite | 100.0 g. | 30.0% | 30.0 g. |
| Grey Cake | 84.0 g. | 1.33% | 1.12 g. |
| As$_2$S$_3$ | 0.40 g. | 0.00% | 0.00 g. |
| CaSO$_4$ Cake | 32.00 g | 1.44% | 0.46 g. |
| Recycled Liquor | 700.0 ml. | 10.39 g/liter | 7.27 g. |
| Light Liquor | 700.0 ml. | 15.02 g/liter | 10.51 g. |
| Concentrated Liquor | 300.0 ml. | 84.21 g/liter | 25.26 g. |

From the above there is obtained a yield of 84.2% of boric acid with respect to that contained in the original colemanite, which is greater than the one obtained by the process from Example 3. This means that the recirculation of the light liquor, in the reaction stage with sulfuric acid, added considerable yield.

EXAMPLE 5

Obtaining Crystals of Boric Acid and Beneficiated Colemanite with Calcium Borate by Multiple Extractions (a) First Extraction:

To 100 grams. of howlite mineral, 500 ml. of water at 95° C. were added, and were homogeneously mixed. Next, 60 ml. of 10 normal sulfuric acid were slowly added in order to lightly acidify the solution. Later the mixture was heated to boiling to carry out the complete reaction.

The suspension formed was filtered while hot and a grey cake was separated and dried.

The boric acid liquor obtained in solution was prepared to be recycled to the next extraction, obtained a liquor volume of 550 ml.

(b) Second Extraction:

To the 500 ml. of the obtained liquor of the first extraction, 100 grams of howlite were added forming a suspension. Next 60 ml. of 10 normal sulfuric acid was added and the mixture was heated to reach boiling and was filtered while hot. From said filtrate a grey cake was obtained which was washed with 50 ml. of water at 95° C. and thereafter was separated and dried.

The liquor of the boric acid that was obtained from said second extraction, at a temperature of 80° C. and in a volume of 600 ml., was heated to reach boiling and was prepared for the next extraction.

(c) Third Extraction:

To the hot liquor obtained from the second extraction (600 ml.), 100 grams. of howlite mineral were added and mixed.

Next 60 ml. of 10 normal sulfuric acid was added. The mixture was heated to reach boiling and was filtered while hot in order to obtain a grey cake which was washed with 50 ml. of water to 95° C. and thereafter was separated and dried.

650 ml. of the liquor of boric acid at a temperature of 80° C. were obtained.

(d) Elimination of Arsenic:

650 ml. of boric acid liquor from the third extraction was obtained and while the solution was hot, gaseous hydrogen sulfide was injected in order to precipitate the arsenic. An excess amount of gas was injected.

The suspension was filtered while hot in order to separate the precipitated As$_2$S$_3$ and to avoid the precipitation of the boric acid contained in the liquor.

The arsenic sulfate obtained was separated and was allowed to dry. The solution of filtrate obtained was heated for a short time in order to expel the excess of sulfuric acid in solution.

(e) Obtaining Crystals of Boric Acid

The solution obtained from the elimination stage of the arsenic in a volume of 650 ml., was cooled from a temperature of 95° C. to 28° C. to precipitate the crystals of boric acid. The saturated solution of boric acid was filtered to separate said crystals and also was filtered to obtain a saturated liquor at a temperature of 16° C.

The crystals were dried to be used in another stage. The volume of filtrate obtained was 540 ml. and was sent to the next step.

(f) Obtaining Beneficiated Colemanite with Calcium Borate

The 540 ml of the filtrate obtained from the above stage, was heated to precipitate the boric acid and the sulfates with lime slurry. In this stage, 100 ml. of lime slurry, with a concentration of 213 grams/liter of Ca(OH)$_2$ was added.

The solution was heated in order to obtain a hot reaction at 98° C. and was left to repose for half an hour to digest the mixture of the reaction.

The suspension was filtered while cool to separate the sludges of precipitated borate from the clear liquor. Said liquor in a volume of 435 ml. was depreciated.

The cake of the beneficiated colemanite with calcium borate was dried. Then a beneficiated colemanite with calcium borate was obtained.

The results obtained from the present process are as follows:

| PRODUCT | CONCEN-TRATION | GRAMS OF $H_3BO_3$ | TOTAL GRAMS OF $H_3BO_3$ |
|---|---|---|---|
| (I) 100 g. howlite | 29.0% | 29.00 g. | |
| (II) 100 g. howlite | 29.0% | 29.00 g. | |
| (III) 100 g. howlite | 29.0% | 29.00 g. | 87.0 g. input |
| (I) 86.4 g. grey cake | — | 1.34 g. | |
| (II) 86.4 g. grey cake | — | 2.12 g. | |
| (III) 86.4 g. grey cake | — | 1.21 g. | |
| (IV) 0.41 g. $As_2S_3$ | 0.00% | 0.00 g. | |
| (V) 4.35 ml. final filtrate | 5.70 g/liter | 2.43 g. | 7.15 g. lost 8.22% |
| (VI) 6.15 g crystals | 94.83% | 53.32 g. | 58.32 g. recovered - 67.03% |
| (VII) 52.09 g. beneficiated colemanite | 41.33% | 21.53 g. | 21.53 g. recovered - 24.75% |

The yield of boric acid crystals obtained is 67.03%. The yield of boric oxide as beneficiated colemanite is 24.75%. Thus the total yield of the present process is 91.78%.

EXAMPLE 6

Obtaining Beneficiated Colemanite with Calcium Borate by Multiple Extractions (a) First Extraction:

50 grams. of colemanite mineral was obtained and was suspended in 250 ml. of water at a temperature of 95° C. 30 ml. of sulfuric acid, 10 normal, was added and later the suspension was heated to reach its boiling point to carry out the reaction and was filtered while hot. The grey cake thus obtained was washed with 25 ml. of water at a temperature of 95° C. A volume of 275 ml. of the obtained filtrate was heated and prepared for the next extraction.

(b) Second Extraction:

An additional 50 grams of colemanite mineral were dissolved in a volume of 275 ml. of liquor from the filtrate obtained from the first extraction, at a temperature of 95° C. Then, 30 ml. of 10 normal sulfuric acid, were added. The mixture was heated to reach its boiling point and then the reaction was filtered while hot and the grey cake thus obtained was washed with 25 ml. of water, while the filtrate obtained, having a volume of 300 ml., was heated to 95° C., and was prepared for the next extraction.

(c) Third Extraction:

An additional 50 grams of colemanite mineral was obtained and was suspended in a volume of 300 ml. of the filtrate from the second extraction which had been heated at a temperature of 95° C. 30 ml. of sulfuric acid, 10 normal, were added and the mixture was heated to reach its boiling point to achieve complete reaction and was filtered while hot, and the grey cake thus obtained was washed with 40 ml. of water to 95° C. The filtrate obtained as liquor from the third extraction was prepared for obtaining the beneficiated colemanite with calcium borate.

(d) Precipitation of the Beneficiated Colemanite:

A volume of 340 ml. of the liquor obtained from the third extraction was heated at a temperature of 95° C. 100 ml. of lime slurry having a concentration of 292.6 g/liter of $Ca(OH)_2$ was added. The mixture was agitated and was left to repose for one hour for its appropriate digestion.

The suspension was filtered to separate the precipitate. Then a final filtrate of 270 ml. of a cake of wet colemanite of 162.0 grams was obtained. The cake was dried to obtain it as a final product. The results obtained are as follows:

| PRODUCTS | AMOUNT | CONCEN-TRATION | GR. OF $H_3BO_3$ | YIELD |
|---|---|---|---|---|
| Mineral Colemanite | 150 g. | 29.0% | 43.5 g. | |
| Beneficiated Colemanite | 57.20 g. | 63.30% | 36.21 g. | 83.24% |
| Final Liquor | 270 ml. | 17.60 g/liter | 4.73 g. | |

From the above it can be seen that a new process has been provided for obtaining beneficiated colemanite and/or howlite minerals, suitable for the benefaction of minerals with a low content of boron compounds and a high content of arsenic and iron impurities in order to obtain a beneficiated colemanite with boron, that has an average concentration of 38% to 48% of boric oxide. This process shows an extraordinary high recuperation that could be changed to between 70% and 86% with respect to the components of boron contained in the original mineral. All of which can be carried by the stages of the present process which are very simple and economical, allowing for the possibility of exploitation of colemanite and/or howlite minerals which up until now, had been impossible to exploit through the use of traditional processes. Thus, this process greatly contributes to boric oxide production, particularly for utilization in the glass industry. This is so because the colemanite and/or howlite minerals of low grade are very large and abundant.

Even though, the above has shown and described with respect to various specific embodiments of the present invention, it must be pointed out that numerous modifications to said embodiments are possible. Therefore, the present invention must not be viewed as restrictive, except with respect to that which is taught by the prior art and by the scope of the attached claims.

I claim:

1. Process to benefit colemanite minerals, howlite minerals, or mixtures thereof comprising: (a) treating the mineral with sulfuric acid in order to dissolve the boron compounds, which forms a solution in a suspension with insoluble solids; (b) separating the solution from the insoluble solids of the suspension; (c) reacting the separated solution with hydrogen sulfide to precipitate arsenic and iron impurities; and (d) separating the precipitated impurities from the solution of step (c) which results in a beneficiated colemanite with boron, a beneficiated howlite with boron, or a mixture of beneficiated colemanite and howlite with boron.

2. The process as claimed in claim 1, wherein the solution of the beneficiated mineral with boron is dried in order to obtain a solid beneficiated mineral with boron.

3. The process as claimed in claim 1, wherein the solution of the beneficiated mineral with boron is reacted with calcium hydroxide in order to precipitate a beneficiated mineral with calcium borate which is separated from the remaining solution.

4. The process as claimed in claim 3, wherein the remaining solution after the separation of the beneficiated mineral with the precipitated calcium borate is recycled to the stage of (a) of the treatment of mineral with sulfuric acid in order to concentrate the mineral.

5. The process as claimed in claim 3, wherein the beneficiated mineral with the precipitated calcium borate is reacted with sulfuric acid in order to separate the gypsum, and the remaining solution is then evaporated to precipitate boric acid as a product.

6. The process as claimed in claim 5, wherein the boric acid is partially precipitated during the evaporation stage and the remaining solution is recycled to the evaporation stage in order to concentrate the boric acid.

7. The process as claimed in claim 1, wherein the reaction of mineral with sulfuric acid is carried out at a temperature between about 85° C. and the boiling point of the reaction mixture.

8. The process as claimed in claim 7, wherein the reaction of the filtrate from stage (a) with hydrogen sulfide is carried out at a temperature between about 23° C. to 90° C.

9. The process as claimed in claim 2, wherein the drying of the beneficiated mineral with boron is carried out at a temperature between about 75° C. to 95° C.

10. The process as claimed in claim 3, wherein the reaction of the beneficiated mineral solution with boron with calcium hydroxide is carried out at a temperature between about 85° C. and 98° C.

* * * * *